US009613739B2

(12) United States Patent
Rattner et al.

(10) Patent No.: US 9,613,739 B2
(45) Date of Patent: Apr. 4, 2017

(54) ELECTROMAGNETIC MATING INTERFACE

(71) Applicant: QUALCOMM Incorporated, San Diego, CA (US)

(72) Inventors: Zachary David Rattner, San Diego, CA (US); Clayton George Dumstorff, San Diego, CA (US); Daniel Ray Ervin, Oceanside, CA (US); Robert Sean Daley, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 329 days.

(21) Appl. No.: 14/581,961

(22) Filed: Dec. 23, 2014

(65) Prior Publication Data

US 2016/0180999 A1 Jun. 23, 2016

(51) Int. Cl.

| | |
|---|---|
| ***G02B 6/38*** | (2006.01) |
| ***H01F 7/02*** | (2006.01) |
| ***H01F 7/06*** | (2006.01) |
| ***G06F 1/16*** | (2006.01) |
| *H01R 13/62* | (2006.01) |

(52) U.S. Cl.

CPC ............ *H01F 7/06* (2013.01); *G02B 6/3886* (2013.01); *G06F 1/1601* (2013.01); *H01F 7/0278* (2013.01); *H01R 13/6205* (2013.01)

(58) Field of Classification Search

CPC ....... H01F 7/06; H01F 7/0278; G02B 6/3886; H01R 13/6205

See application file for complete search history.

(56) References Cited

U.S. PATENT DOCUMENTS 4,690,495 A 9/1987 Giannini
5,909,100 A * 6/1999 Watanabe .............. H02J 7/025 320/108

(Continued)

FOREIGN PATENT DOCUMENTS

EP 1596461 A1 11/2005

OTHER PUBLICATIONS

International Search Report and Written Opinion—PCT/US2015/064502 ISA/EPO—2016.

*Primary Examiner* — Jared Fureman
*Assistant Examiner* — Joel Barnett
(74) *Attorney, Agent, or Firm* — Loza & Loza LLP

(57) ABSTRACT

Methods and apparatus for automatically coupling stackable modular devices are described. The modular devices may be coupled using electromagnetic forces generated by precisely-timed pulses of electric current through electromagnetic materials that cause a first modular device to screw itself into a second modular device. The modular devices may exchange data through electrical or optical connections after coupling. A method includes detecting that a second modular device is proximately and coaxially located to a first modular device, activating a plurality of electromagnetic elements in an annular electromagnetic array according to a timed sequence, each electromagnetic element being activated at a different time than the other electromagnetic elements in the plurality of electromagnetic elements, detecting that the second modular device is communicatively coupled with the first modular device, and deactivating the plurality of electromagnetic elements after detecting that the second modular device is communicatively coupled with the first modular device.

30 Claims, 14 Drawing Sheets

(56) References Cited

U.S. PATENT DOCUMENTS

| | | | | |
|---|---|---|---|---|
| 7,066,739 | B2 | 6/2006 | McLeish | |
| 7,331,793 | B2 * | 2/2008 | Hernandez | H01F 38/14<br>439/38 |
| 7,658,613 | B1 * | 2/2010 | Griffin | H01R 13/6205<br>439/39 |
| 8,177,560 | B2 | 5/2012 | Rohrbach et al. | |
| 8,798,411 | B1 | 8/2014 | Miller et al. | |
| 8,798,675 | B2 | 8/2014 | Salmon et al. | |
| 2013/0000084 | A1 | 1/2013 | Nassar | |
| 2013/0303000 | A1 | 11/2013 | Witter et al. | |

* cited by examiner

ELECTROMAGNETIC MATING INTERFACE

TECHNICAL FIELD

The present disclosure relates generally to modular and/or expandable electronics systems, and more particularly, to a system for interconnecting two or more hardware modules.

BACKGROUND

Modular electronic systems may employ subsystems and/or elements that can be configured to provide a design that is customized to a particular application. Modular electronic systems may be reconfigured, expanded and/or optimized as application needs or requirements change. Modular electronic systems permit a system to be constructed from one or more subsystems or modules that can be sourced from multiple providers for use in various systems. Modular electronic systems may be characterized as a combination and configuration of functional components that may include discrete, reusable modules that are interconnected using a predefined communications interface, and typically a predefined mechanical structure, such as a rack, frame or the like.

Hardware manufacturers may use various properties such as shape, size, and even magnets to enforce proper orientation of components when connectors of the components mate. In one example, pogo pins may be used. Pogo pins are spring-loaded connectors that allow for individual contact points. In another example, optical emitter/detector pairs permit binary data to be transmitted over pulses of light. These solutions can simplify and enforce orientation of connections. However, such solutions are mainly applicable to cable connections, and have limited application in the connection of discrete hardware devices.

There is a continued need for improved connections between physical devices.

SUMMARY

In various aspects of the disclosure, systems, methods, a computer program product, and apparatus are provided whereby stackable hardware modules can be automatically mated with each other. In one example disclosed herein, modular devices may be connected using electromagnetic forces generated by precisely-timed pulses of electric current through electromagnetic materials to cause a first modular device to screw itself into a socket of a second modular device. The first and second modular devices may be configured to employ a common electrical or optical connection for data transfer to exchange data after connection.

In certain aspects, a method performed at a first modular device in an electronic system includes detecting that a second modular device is located in proximity to and coaxially aligned with the first modular device, activating a plurality of electromagnetic elements in an annular electromagnetic array according to a timed sequence, detecting that the second modular device is communicatively coupled with the first modular device, and deactivating the plurality of electromagnetic elements after detecting that the second modular device is communicatively coupled with the first modular device. Activating the plurality of electromagnetic elements according to the timed sequence may produce a first magnetic field that moves with respect to the annular electromagnetic array and may cause the second modular device to rotate with respect to the first modular device. Activating the plurality of electromagnetic elements according to the timed sequence may include activating each electromagnetic element at a different time than the other electromagnetic elements in the plurality of electromagnetic elements. Activating the plurality of electromagnetic elements according to the timed sequence may produce a first magnetic field that rotates around the annular electromagnetic array. There may be at least some overlap of activation times between two or more of the electromagnetic elements.

In an aspect, an interaction between the first magnetic field and a second magnetic field produced by a magnetic element disposed on the second modular device generates a torque on the second modular device. During the timed sequence, the first magnetic field may engage a permanent magnet disposed on a raised annular element of the first modular device that is aligned with an annular channel provided in a first surface of the first modular device. The annular electromagnetic array may be provided in the annular channel provided in the first surface of the first modular device. The raised annular element of the first modular device may include an embossed rubberized track. The raised annular element may include a threaded element configured to engage a corresponding threaded element of the annular channel when the second modular device is rotated. Continued rotation of the second modular device may fasten the second modular device to the first modular device. Detecting that the second modular device is communicatively coupled with the first modular device may include receiving a signal from a proximity sensor provided on the first surface of the first modular device. Detecting that a second modular device is located in proximity to, and coaxially aligned with the first modular device includes detecting a signal transmitted between the first modular device and the second modular device through a connector located on a first surface of the first modular device.

In an aspect, activating the plurality of electromagnetic elements according to a timed sequence includes providing a voltage pulse to a first electromagnetic element during a first time period while disabling current flow in a second electromagnetic element and a third electromagnetic element, providing a voltage pulse to the second electromagnetic element during a second time period while disabling current flow in the first electromagnetic element and the third electromagnetic element, and providing a voltage pulse to the third electromagnetic element during a third time period while disabling current flow in the first electromagnetic element and the second electromagnetic element.

In an aspect, activating the plurality of electromagnetic elements according to a timed sequence includes providing activation currents during a plurality of time intervals. During a first time period a decreasing voltage may be applied to a first electromagnetic element, a predefined maximum voltage may be applied to a second electromagnetic element, an increasing voltage may be applied to a third electromagnetic element, and current flow may be disabled in a fourth electromagnetic element. During a second time period, a decreasing voltage may be applied to the second electromagnetic element, the predefined maximum voltage may be applied to the third electromagnetic element, an increasing voltage may be applied to the fourth electromagnetic element, and current flow in the first electromagnetic element may be disabled.

In certain aspects, a modular electronic device includes a first proximity detector provided on a first surface of the modular electronic device, an electromagnetic array having a first plurality of electromagnetic elements provided in an annular channel, and a controller configured to provide an activation current to each of the first plurality of electromagnetic elements in a sequence that produces a magnetic field that rotates around the annular channel and that causes the second device to rotate with respect to the modular electronic device. The first proximity detector may be configured to detect a magnetic field emanating from a second device when the second device is positioned in proximity to the modular electronic device such that an axis of the modular electronic device is aligned with an axis of the second device. The controller may be configured to disable the activation currents when the second device is determined to be mated to the modular electronic device in an alignment that provides communicative coupling between the modular electronic device and the second device.

In certain aspects a modular electronic device includes an electromagnetic array that includes a first plurality of electromagnetic elements provided in an annular channel, means for detecting that a second device is located in proximity to and coaxially aligned with the modular electronic device, means for activating each of the first plurality of electromagnetic elements at a different time than the other electromagnetic elements in the plurality of electromagnetic elements, and means for detecting that the second device is communicatively coupled with the modular electronic device. Activating the plurality of electromagnetic elements according to a timed sequence may produce a first magnetic field that rotates around the annular channel and may cause the second device to rotate with respect to the modular electronic device. The means for activating each of the first plurality of electromagnetic elements may be configured to deactivate the first plurality of electromagnetic elements after detecting that the second device is communicatively coupled with the modular electronic device.

In certain aspects, a computer program product may include a computer-readable medium that includes code for detecting that a second modular device is located in proximity to and coaxially aligned with the first modular device, activating a plurality of electromagnetic elements in an annular electromagnetic array according to a timed sequence, detecting that the second modular device is communicatively coupled with the first modular device, and deactivating the plurality of electromagnetic elements after detecting that the second modular device is communicatively coupled with the first modular device. Activating the plurality of electromagnetic elements according to the timed sequence may produce a first magnetic field that moves with respect to the annular electromagnetic array and that causes the second modular device to rotate with respect to the first modular device. Activating the plurality of electromagnetic elements according to the timed sequence may include activating each electromagnetic element at a different time than the other electromagnetic elements in the plurality of electromagnetic elements.

DETAILED DESCRIPTION

Figure 1:
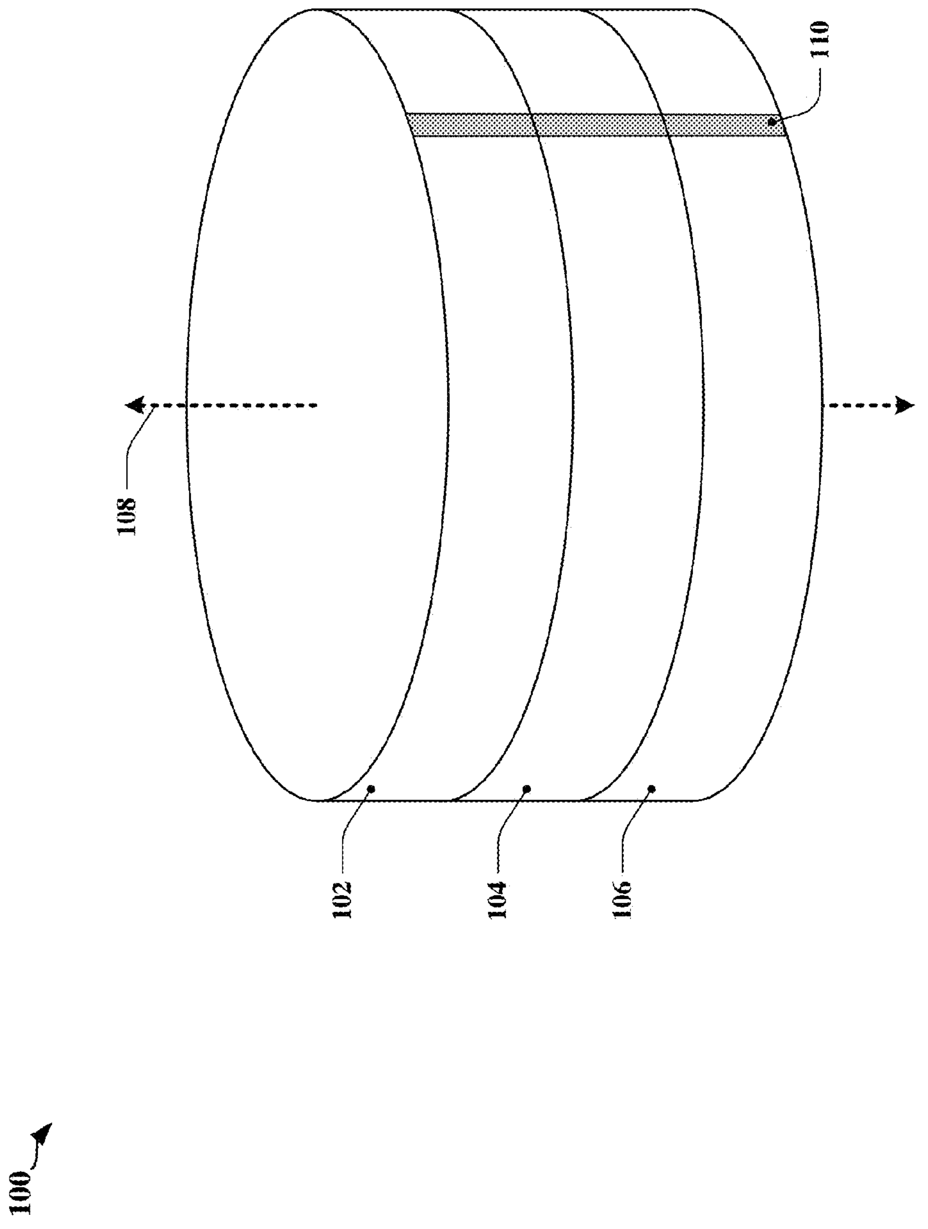
FIG. 1 illustrates an example of a fully-connected modular system that may be adapted or configured in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of electronics systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Certain aspects of the present invention relate to modular hardware devices that may be attached or detached from one another in order to configure the function of an electronics system. In one example, automated device connection is accomplished by providing precisely-timed pulses of electric current that generate electromagnetic fields that interact to cause an upper device to screw its threaded connector into a socket into a lower device. The upper device may be electromagnetically propelled until electrical or optical connections are established between the upper and lower devices.

The upper device may be configured to operate as a rotor of an electric motor while the lower device may be configured to operate as a stator. The term "rotor" may be defined as meaning the moving element of an electric rotary system (e.g., electric motor), which rotates when the presence of certain electromagnetic fields generate a torque about an axis of the rotor. The term "stator" may be defined as meaning a substantially stationary element of the electric rotary system, which may generate the electromagnetic fields that generate the torque that causes the rotor to rotate. In some instances, the stator may also rotate to some degree and the definition of the term "stator" may apply to a non-stationary element of the electric rotary system that generates electromagnetic fields, while the term "rotor" may apply to an element of the electric rotary system in which a torque is developed by the electromagnetic fields generated by the stator.

FIG. 1 illustrates an example of a fully-connected modular system 100 that may be adapted or configured in accordance with certain aspects disclosed herein. The system 100 includes three modular components 102, 104, 106 that each have a substantially circular cross-section and that are concentrically aligned along an axis 108. In the example, each modular component 102, 104, 106 may have a marking or structure 110 that indicates when the modular component 102, 104, 106 is in a desired alignment with the other modular components 102, 104, 106. Each modular component 102, 104, 106 may include circuits and systems that may cooperate with circuits and systems of other modular components 102, 104, 106 to perform one or more functions. In one example, a modular component 102, 104, or 106 may include transceivers and/or modems that support a communications interface with external devices or systems. In another example, a modular component 102, 104, or 106 may include a codec, or other audiovisual circuit used to provide a user interface. In another example, a modular component 102, 104, or 106 may include storage. In another example, a modular component 102, 104, or 106 may include one or more processing circuits.

According to certain aspects disclosed herein, two or more modular components 102, 104, and/or 106 of the modular system 100 may be easily connected by bringing the upper device into proximate alignment with the lower device, such that one or more electromagnetic components are automatically activated causing the upper device to screw itself into the lower device. Assembly may be accomplished without the assistance of external motors, moving parts and/or without further human intervention. A pair of modular components 102, 104, and/or 106 may form or function as components of a motor that operates using electromagnetic fields to cause relative rotation of the two or more modular components 102, 104, and/or 106. The automated assembly components are virtually maintenance-free, having no distinct or independently moving parts.

The modular system 100 may include two or more modular components 102, 104, 106 configured such that the modular components 102, 104, 106 are linked together from top to bottom. That is, the top of a first modular component 102, 104, or 106 mates with the bottom of an adjacent modular component 102, 104, or 106 that is positioned above the first modular component 102, 104, or 106.

Figure 2:
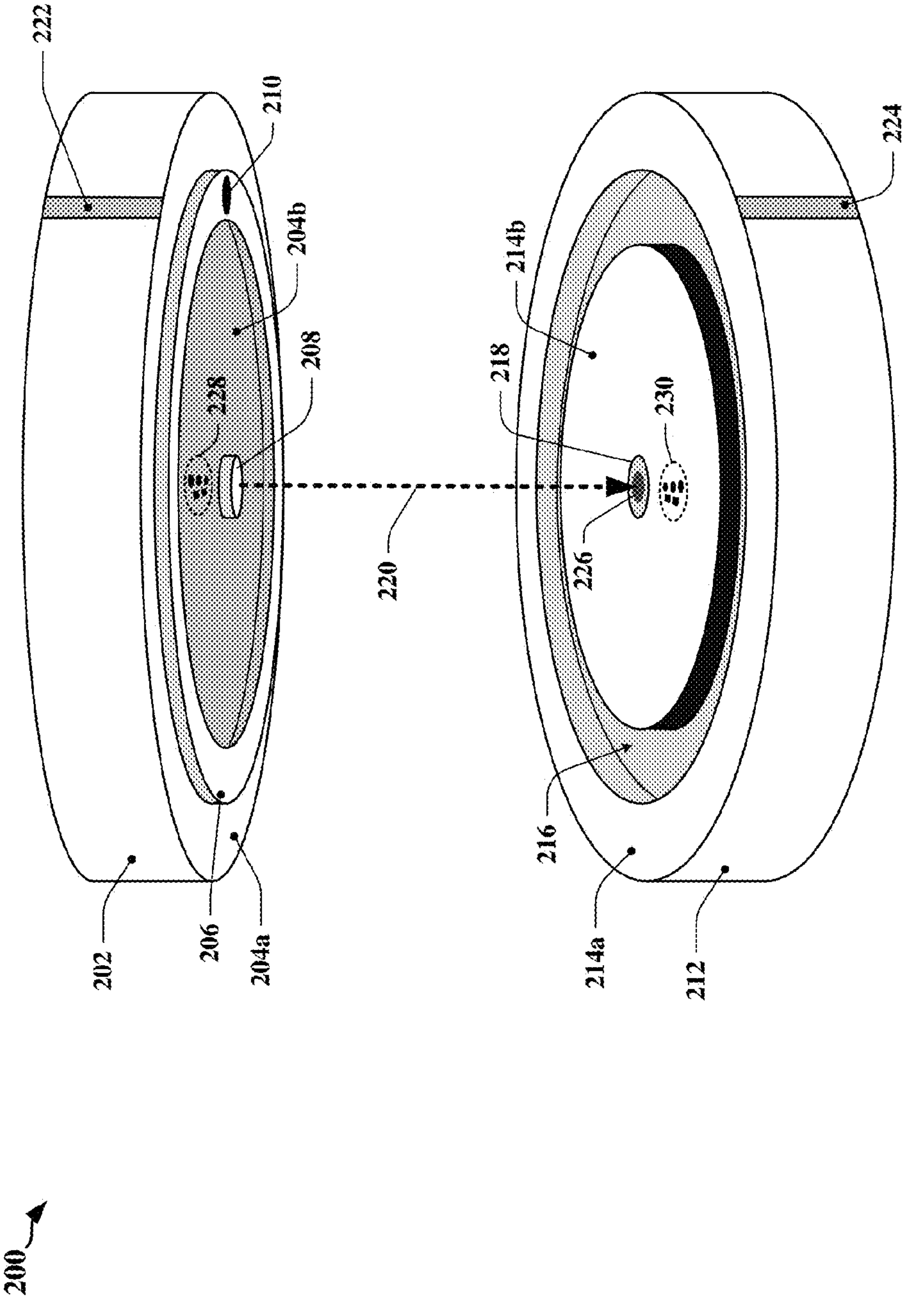
FIG. 2 provides an exploded view of two modular devices illustrating certain aspects related to the automated assembly of the two modular devices.
Figure 3:
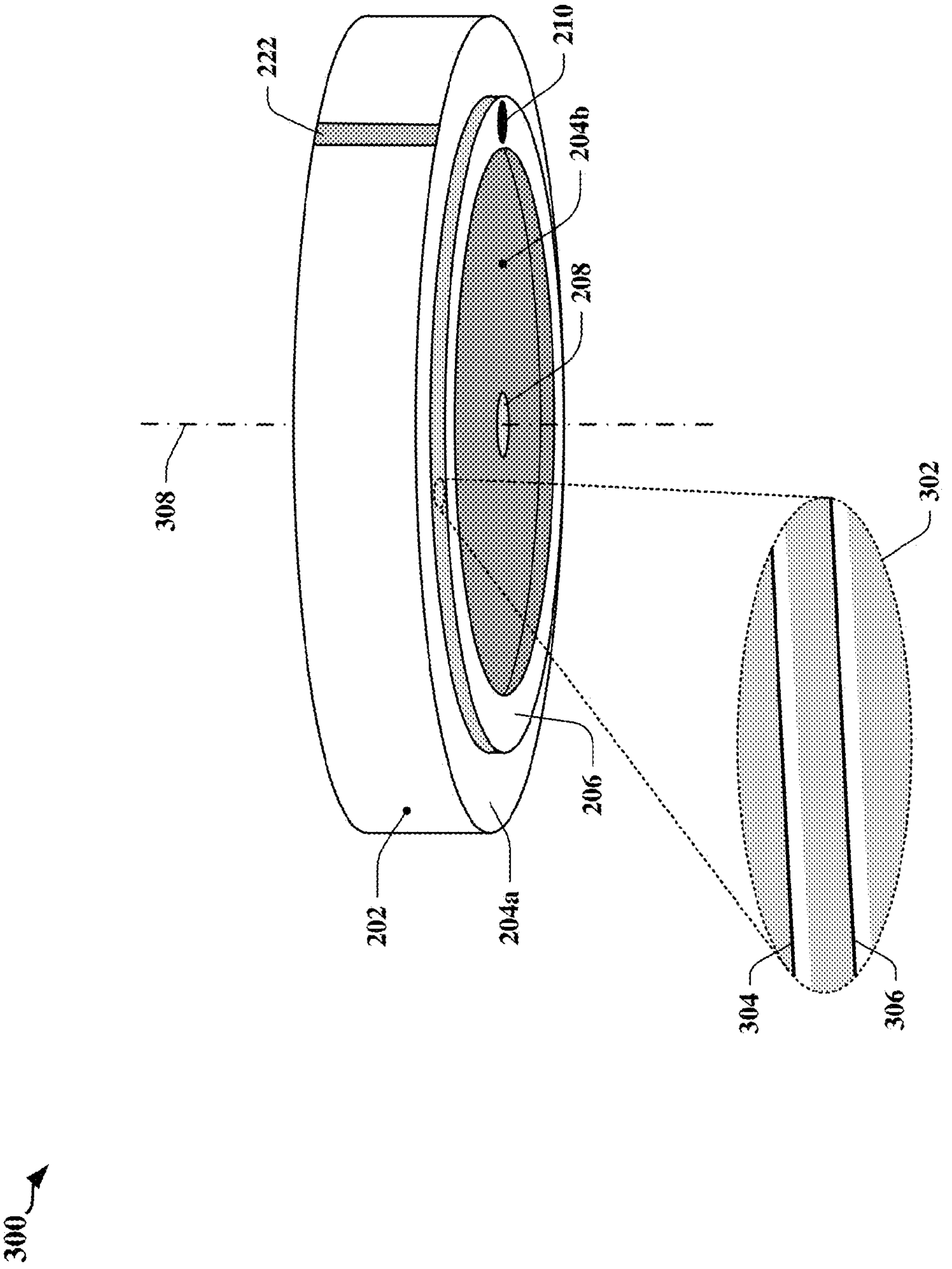
FIG. 3 is a diagram showing an isolated view of a first one of the two modular devices illustrated in FIG. 2.
Figure 4:
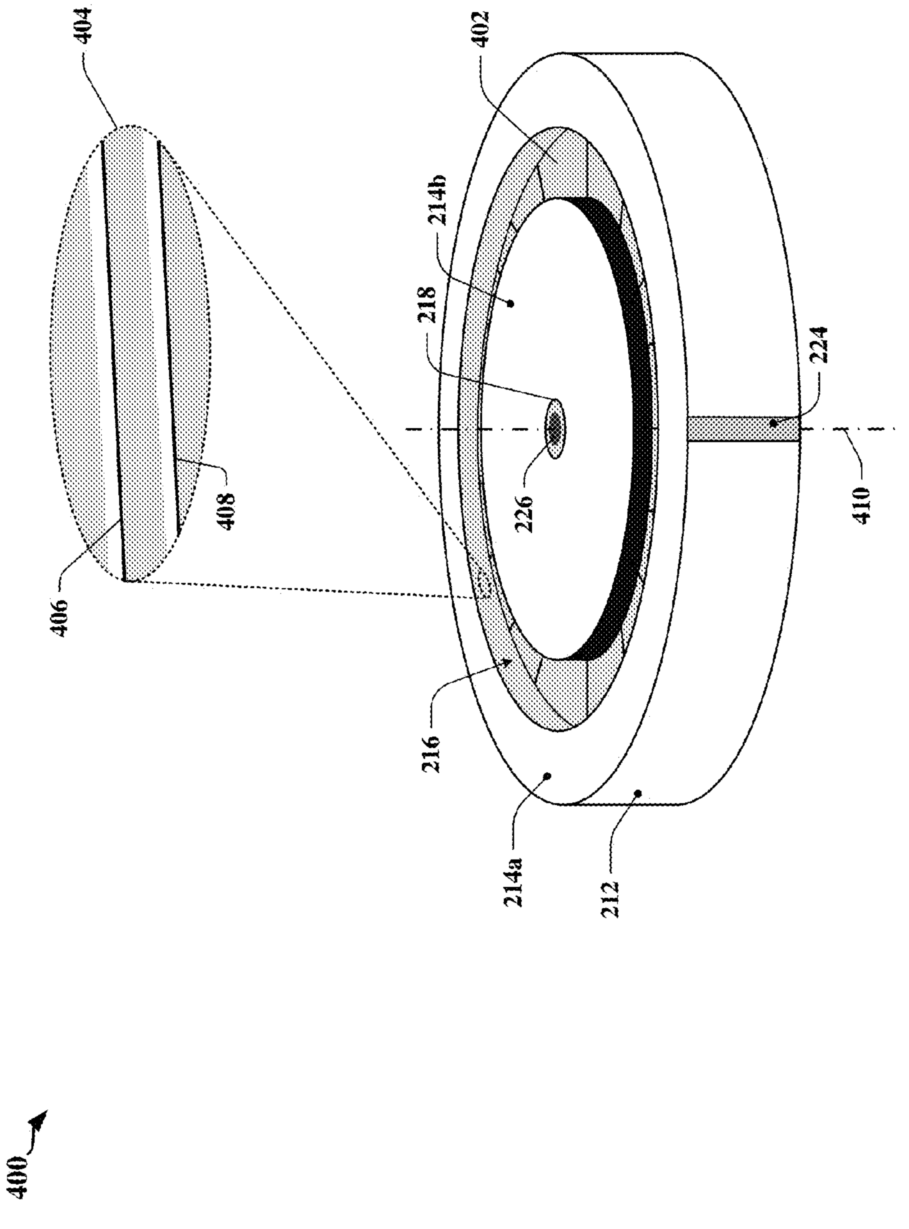
FIG. 4 is a diagram showing an isolated view of a second one of the two modular devices illustrated in FIG. 2.

FIG. 2 is an exploded view 200 illustrating certain aspects related to the automated assembly of two modular components 202, 212. FIGS. 3 and 4 provide isolated views of the modular components 202, 212. For the purposes of this description, it will be assumed that a first modular device 202 is presented for assembly from a position vertically above the second modular device 212 and, accordingly, the first modular device 202 may be referred to as the upper or top modular device 202, while the second modular device 212 may be referred to as the lower, base, or bottom modular device 212.

The top modular device 202 may be joined to the bottom modular device 212 during an assembly process. For the purposes of this description, it may be assumed that the bottom modular device 212 is powered and positioned generally as shown in FIGS. 2 and 4 during assembly, such that an axis 410 of the bottom modular device 212 has a substantially vertical orientation. Assembly may commence when the top modular device 202 is brought into coaxial alignment with the bottom modular device 212 and in close enough proximity that a proximity sensor 226 of the bottom modular device 212 can detect the presence of the top modular device 202. Coaxial alignment may be established when an axis 308 of the top modular device 202 is merged with an axis 410 of the bottom modular device 212. In one example, the top modular device 202 may be detected by the proximity sensor 226 when a raised annular element 206 provided on the top modular device 202 is at least partially inserted within an annular channel 216 provided on the bottom modular device 212. In some instances, threaded elements of the top modular device 202 and the bottom modular device 212 may be in contact with one another, and/or partially engaged when the top modular device 202 is detected by the proximity sensor 226.

During assembly, the top modular device 202 may travel toward the bottom modular device 212 in a direction illustrated by the arrow 220. The top modular device 202 and the bottom modular device 212 may be considered to be assembled, attached, and/or mated when one or more portions of a lower surface 204*a*, 204*b* of the top modular device 202 are in contact with corresponding portions of an upper surface 214*a*, 214*b* of the bottom modular device 212 such that the top modular device 202 is communicatively coupled with the bottom modular device 212. The devices 202, 212 may be communicatively coupled when the devices 202, 212 can exchange data through electrical and/or optical connectors 228, 230 provided on respective surfaces 204*a*/204*b* and 214*a*/214*b*.

In the illustrated example, both the lower surface 204*a*, 204*b* of the top modular device 202 and the upper surface 214*a*, 214*b* of the bottom modular device 212 have substantially circular profiles. One or more portions on the lower surface 204*a*, 204*b* of the top modular device 202 may be separated by a raised annular element 206 that is configured to engage with a corresponding annular channel 216 that separates portions of the upper surface 214*a*, 214*b* of the bottom modular device 212. The raised annular element 206 may be provided using an embossed circular rubberized track. One or more sides of the raised annular element 206 may include a threaded element. In one example, an outer perimeter of the raised annular element 206 may be lined with an annular, threaded tube that provides threads 304, 306 (see magnified view 302 in FIG. 3) that can be used to fasten the top modular device 202 to the bottom modular device 212.

The annular channel 216 of the bottom modular device 212 may include a threaded element that engages with the threaded element provided on the raised annular element 206 of the top modular device 202. In one example, the threaded element provides threads 406, 408 (see magnified view 404 in FIG. 4) that may be used to fasten the top modular device 202 to the bottom modular device 212. The annular channel 216 may include electromagnetic elements 402, which may be provided on the floor of the channel 216 and/or on at least one wall of the channel 216.

In some instances, a first permanent magnet 208 is disposed at or near the center of the lower surface 204*b* of the top modular device 202. The first permanent magnet 208 may be disposed such that its lower surface is flush with the surface 204*b* of the top modular device 202, recessed with respect to the surface 204*b* of the top modular device 202, or protruding from the surface 204*b* of the top modular device 202. In one example, the first permanent magnet 208 may be provided in a channel and placed under pressure from a spring, or the like, such that the first permanent magnet 208 may retract as the top modular device 202 travels toward the bottom modular device 212.

In one example, the first permanent magnet 208 may be formed from neodymium, and may be deployed with its south pole facing downwards (i.e., facing toward the lower modular device 212). Certain descriptions refer to a configuration of magnets that involves a specified orientation of the magnetic north pole and/or south pole of a magnet. It can be appreciated that the configuration of poles may be reversed without affecting overall functionality. Accordingly, the use of north pole or south pole in the description does not limit any particular embodiment to the described pole orientations.

A second permanent magnet 210 may be provided on the outer surface of the raised annular element 206. The second permanent magnet 210 may be deployed with its south end facing downwards. A threaded tube may line the perimeter or interior wall of the circular track.

In some instances, a magnetic element 218 may be disposed at the center of the upper surface 214*b* of the lower modular device 212. In one example, the magnetic element may be a permanent magnet with its north pole facing upward towards the upper modular device 202. In another example, the magnetic element 218 may be constructed from a magnetic material that is responsive to an applied magnetic field. Magnetic materials may include ferromagnetic materials. The magnetic element 218 may be configured to respond to the first permanent magnet 208 such that the top modular device 202 is attracted and aligned to the bottom modular device 212. In some examples, the modular components 202, 212 may be provided without one or more of the magnetic elements 208 and 218, particularly where assistance in alignment of the modular components 202, 212 provides limited benefit.

A proximity sensor 226 may be provided at or near the center of the upper surface 214*b* of the lower modular device 212. In one example, the proximity sensor 226 may include a Hall effect device or Reed switch placed next to, above, or behind the magnetic element 218, such that the proximity sensor 226 is activated in the presence of an applied magnetic field emanating from the first permanent magnet 208, when the top modular device 202 is brought into proximity of the surface 214*b* of the bottom modular device 212. In one example, a Hall effect device in or near the proximity sensor 226 may be aligned such that the presence of a magnetic south pole toggles its output voltage.

The annular channel 216 of the bottom modular device 212 may include an embossed circular area lined with an array of individually addressable electromagnetic elements 402 arranged at intervals around the circumference of the channel 216. Each electromagnetic element 402 may produce a field when driven by an activation current, and have no magnetic polarity in the absence of the activation current. In one example, the activation current produces a field corresponding to a magnetic north pole at the surface of the annular channel 216, where the field has sufficient strength to repel the permanent magnet 210 mounted on the annular track 206 of the top modular device 202. The electromagnetic elements 402 can be operated in a manner that causes the top modular device 202 and the bottom modular device 212 to rotate with respect to one another.

Figure 5:
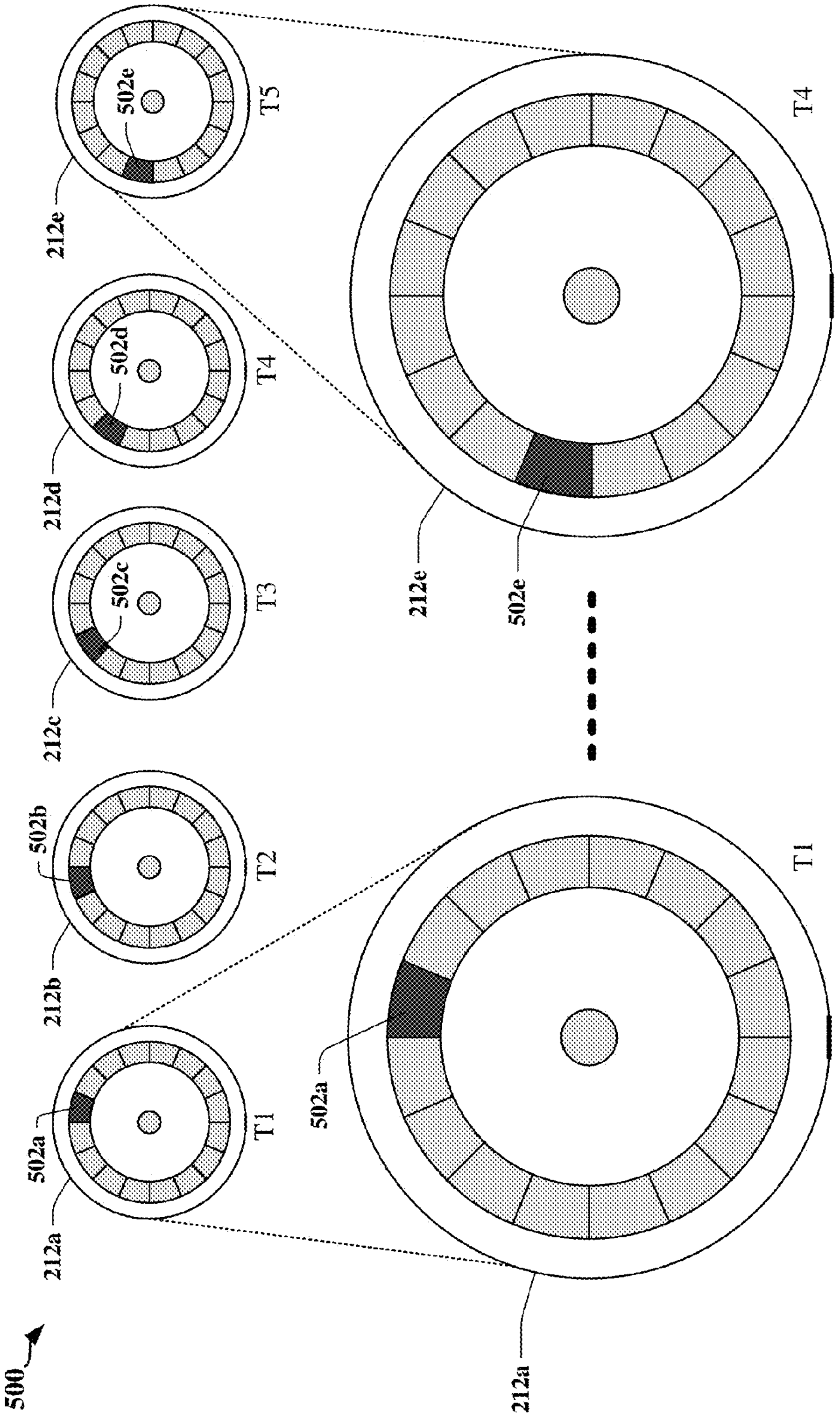
FIG. 5 is a diagram of a time sequence that illustrates the use of electromagnetic devices that may induce rotational motion of a modular device.

FIG. 5 is a diagram showing one example of a time sequence 500 that illustrates the operation of electromagnetic devices 502*a*, 502*b*, 502*c*, 502*d*, and 502*e* in a manner that may induce rotational motion of the top modular device 202 with respect to the bottom modular device 212. The time sequence 500 includes 5 instances 212*a*-212*e* of the bottom modular component, in which a different electromagnetic element 502*a*-502*e* is activated. Effectively, a pulse may be provided to each of the electromagnetic elements 502*a*-502*c* in consecutive order, such that a magnetic field rotates in a counter-clockwise direction around the annular channel 216. In the example discussed herein, an upward-facing north pole magnetic field circulates the annular channel 216 provided in the surface 214*a*, 214*b* of the bottom modular device 212 when current is pulsed through each electromagnetic element 502*a*-502*e*.

Various different time sequences may be employed. Each time sequence may be configured to obtain or affect certain aspects of the rotation of top modular device 202 with respect to the bottom modular device 212. For example, different time sequences may be used to obtain a direction of rotation, variable torque, a desired speed of rotation, variable rates of acceleration, etc. The arrangement of physical locations of the electromagnetic elements 502*a*-502*e* does not necessarily dictate an order of activation of individual electromagnetic elements 502*a*, 502*b*, 502*c*, 502*d*, or 502*e*, and/or groups of the electromagnetic elements 502*a*-502*e*.

Figure 6:
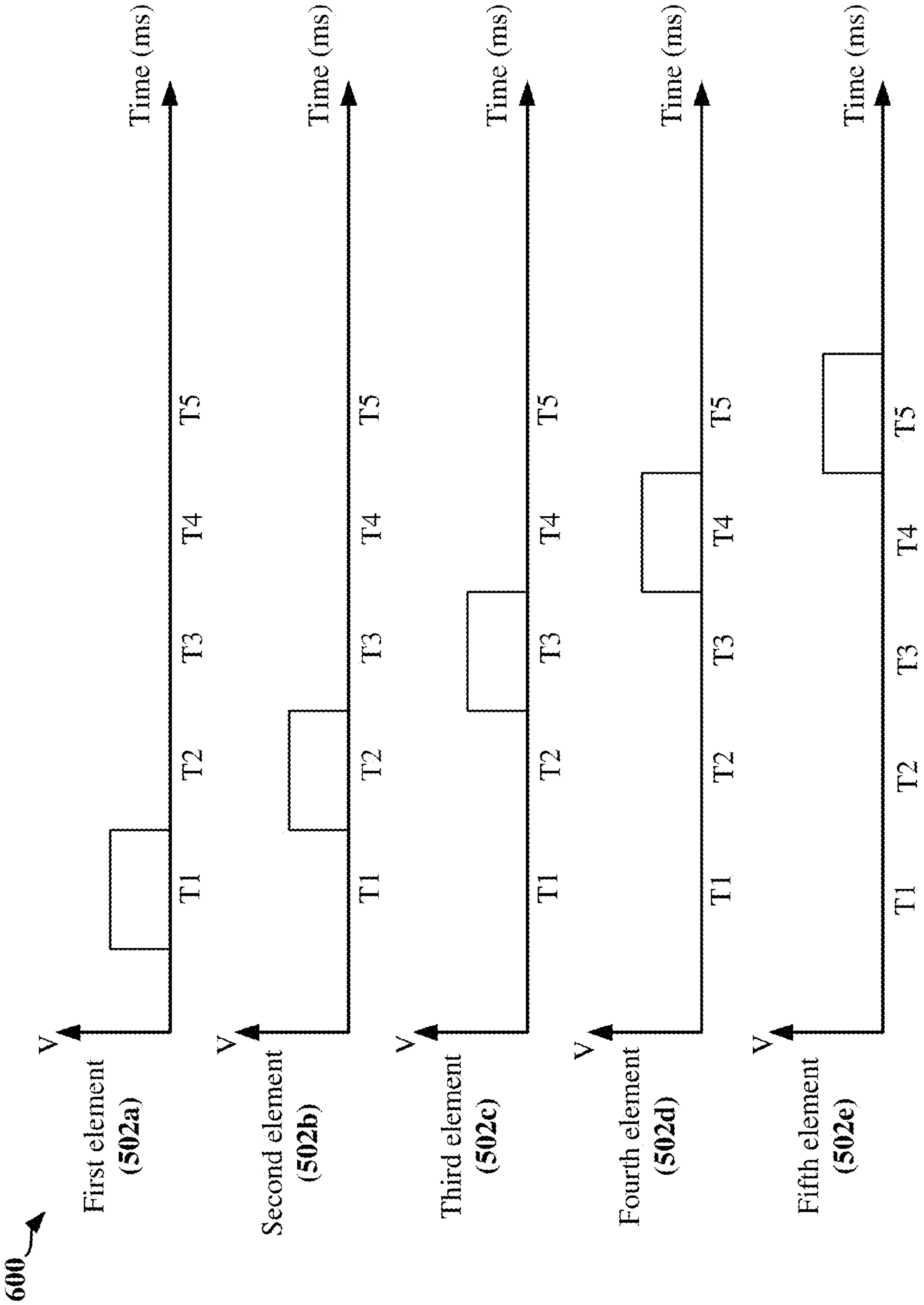
FIG. 6 includes timing diagrams illustrating a first example of the provision of an activation voltage to electromagnetic elements in different time intervals in accordance with certain aspects disclosed herein.

FIG. 6 includes a set of timing diagrams 600 illustrating the provision of an activation voltage to each of the five electromagnetic elements 502*a*-502*e* in different time intervals. In one example, an activation voltage may be used to switch or otherwise control the flow of activation current to a selected one of the electromagnetic elements 502*a*-502*e*. In another example, the activation voltage may be provided across a selected one of the electromagnetic elements 502*a*-502*e* in order to produce the desired activation current.

Regardless of the rotational orientation of the top modular device 202 with respect to the bottom modular device 212, at some point during rotation, the rotating electromagnetic field may become aligned with, engage and/or interact with the second permanent magnet 210 provided on the rail 206 of the top modular device 202. Upon acquiring alignment, the rotating electromagnetic field may cause the top modular device 202 to rotate and screw itself into the bottom modular device 212 through the threads 304, 306 provided in the rail 206 and the threads 406, 408 annular channel 216.

With further reference to FIG. 2, electrical or optical connectors 228 may be deployed on a surface 204*a* and/or 204*b* of the top modular device 202 and mating electrical or optical connectors 230 may be disposed on corresponding surfaces 214*a* and/or 214*b* of the bottom modular device 212. In some instances, rotation may be terminated when it is determined that the top modular device 202 and the bottom modular device 212 are mated and in alignment. Such determination may be based on establishment of an electrical or optical connection through these connections 228 and 230. In some instances, a magnetic sensor may be positioned to detect when the magnetic field is strong enough to infer that the top modular device 202 and the bottom modular device 212 are coupled and in alignment.

In some instances, more than one electromagnetic element 502 may be activated at the same time. In one example, diametrically opposed electromagnetic elements 502 may be activated together to increase the active electromagnetic surface area and improve the speed and reliability of finding the synchronization point of the top modular device 202. In this example, diametrically opposed permanent magnets 210 deployed on the annular ring 206 of the top modular device 202 may provide balanced application of rotational force and better torque for fastening the top modular device 202 to the bottom modular device 212. In another example, pairs of electromagnetic elements 502 may be activated such that one electromagnetic element 502 repels the second permanent magnet 210 in the direction of rotation while the other electromagnetic element 502 attracts the second permanent magnet 210 along the direction of rotation.

Figure 7:
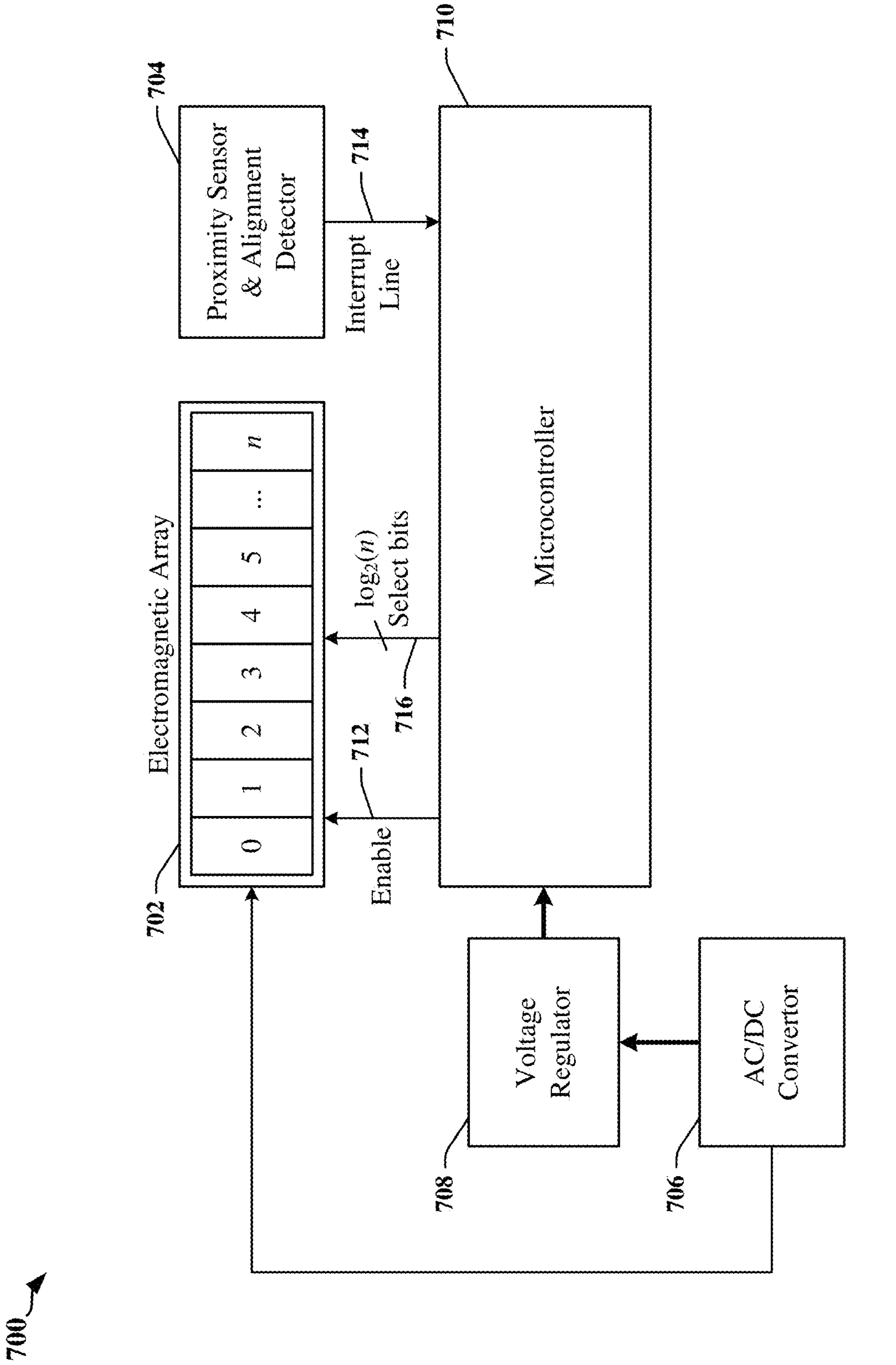
FIG. 7 is a block schematic diagram illustrating a first circuit that may be used to operate an electromagnetic array according to certain aspects disclosed herein.

FIG. 7 is a block schematic diagram 700 illustrating a first circuit that may be configured to operate an electromagnetic array 702 provided in the annular channel 216 of the bottom modular device 212. In this example, a microcontroller 710 is configured to provide an element select signal 716 that selects one or more elements of the electromagnetic array 702 for receiving an activation current. The selection signal 716 may have a number of bits sufficient to address the number of available, independently addressable elements in the electromagnetic array 702. An enable signal 712 may be provided to gate and/or control the activation current, which may be provided by an AC/DC converter 706 or voltage regulator 708. The microcontroller 710 may receive an interrupt signal 714 from one or more proximity sensors and/or alignment detectors 704. A first proximity sensor 704 may be configured to detect proximity of a module to be attached and to assert the interrupt signal 714 to initiate the automatic attachment procedure. A second proximity sensor 704 may be configured to detect when the top modular device 202 and the bottom modular device 212 are communicatively coupled. In some instances, one or more proximity sensors 704 may be implemented using a Hall effect device, a Reed switch, or other suitable electromagnetically actuated sensors. In some instances, a proximity sensor/alignment detector 704 may be implemented using a circuit configured to detect a signal or pattern of signals transmitted through connectors between the top modular device 202 and the bottom modular device 212.

Figure 8:
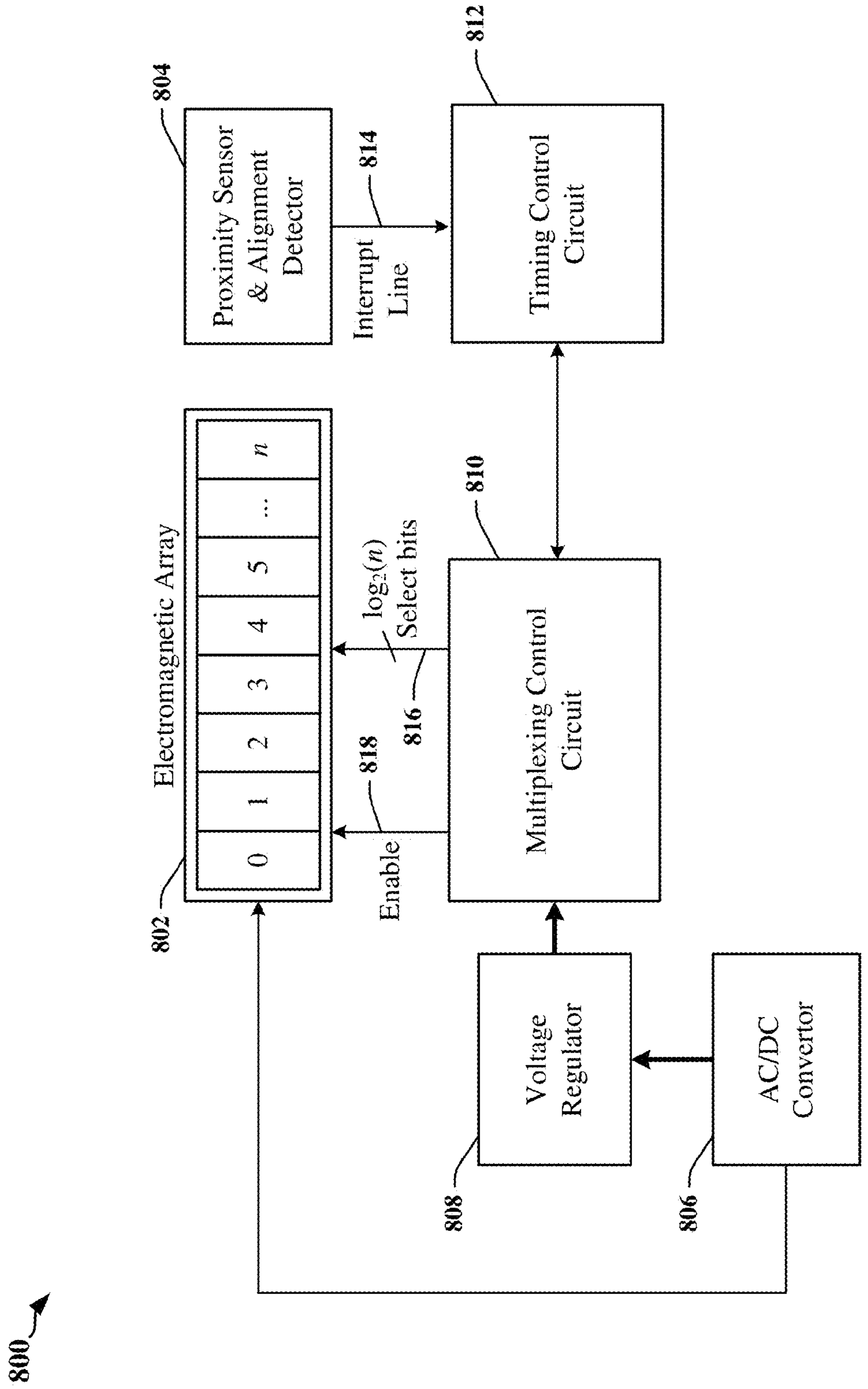
FIG. 8 is a block schematic diagram illustrating a second circuit that may be used to operate an electromagnetic array.

FIG. 8 is a block schematic diagram 800 illustrating a second circuit that may be configured to operate an electromagnetic array 802 provided in the annular channel 216 of the bottom modular device 212. In this example, a selection signal 816 and an enable signal 818 may be generated by a multiplexing control circuit 810 which may be controlled according to one or more timing control circuits 812. The timing control circuits 812 may include timer devices (e.g. a 555 timer). The multiplexing control circuit 810 may be implemented using a state machine or other logic and may produce a select signal 816 having a number of bits sufficient to address the number of available, independently addressable elements in the electromagnetic array 802. An enable signal 818 may be provided to gate the activation current, which may be provided by an AC/DC converter 806 or voltage regulator 808. The multiplexing control circuit 810 may monitor one or more interrupt or other signals 814 provided by proximity sensors and/or alignment detectors 804. A first proximity sensor 804 may be configured to detect proximity of a module to be attached, and to assert the interrupt signal 814 to initiate the automatic attachment procedure. A proximity sensor and/or alignment detector 804 may be configured to detect when the top modular device 202 and the bottom modular device 212 are communicatively coupled. In some instances, a proximity sensor 804 may be implemented using a Hall effect device, a Reed switch, or other suitable electromagnetically actuated sensors. In some instances, an alignment detector 804 may be configured to detect a signal or pattern of signals transmitted through connectors between the top modular device 202 and the bottom modular device 212

Figure 9:
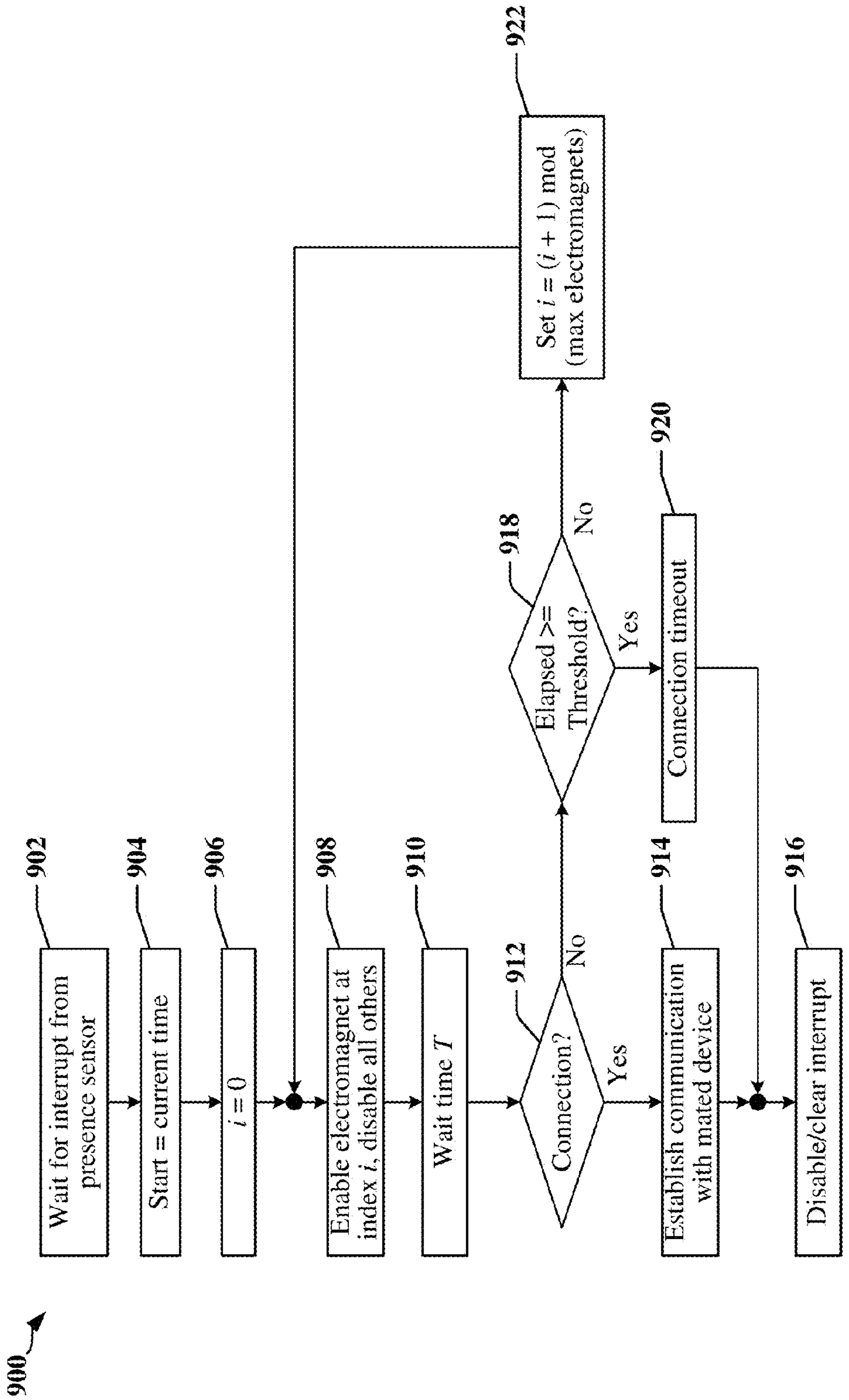
FIG. 9 is a flowchart illustrating the operation of an electromagnetic mating interface in accordance with certain aspects disclosed herein.

FIG. 9 is a flowchart 900 illustrating the operation of an electromagnetic mating interface in accordance with certain aspects disclosed herein. In one example, the process described in the flowchart 900 may be implemented by a processor, such as the microcontroller 710 of FIG. 7, in response to instructions and configuration information provided in storage that is accessible by the processor. In another example, the process described in the flowchart 900 may be implemented using a combination of sensors 804, timing circuits 812 and the multiplexing control circuit 810. The process described in the flowchart 900 may be performed by the bottom modular device 212, which may operate as a stator while the top modular device 202 functions as a rotor in accordance with certain aspects disclosed herein.

In block 902, an electromagnetic mating interface in the bottom modular device 212 may be in an idle state until an interrupt signal is received on the interrupt line 714, 814. An automated docking or mating process may then be initiated. In block 904, the current time may be recorded and/or a timer may be initiated to determine the maximum time permitted for attempting automated mating.

In block 906, an electromagnetic element selector (i) is initiated. The select bits 716, 816 that control which element or elements of the electromagnetic array 702 receive an activation current may reflect the value of the element selector. In one example, the element selector may lie within the range defined as 0≤i<K, where K is the number of elements in the electromagnetic array 702. In this example, each element of the electromagnetic array 702 may receive an activation current pulse in turn. In at least some instances, the electromagnetic array 702 may include pairs, triplets, etc. of elements that are wired together or otherwise are configured to concurrently receive an activation pulse. In these instances, the number K may represent the number of pairs, triplets, etc. of elements in the electromagnetic array 702.

In block 908, the element or elements of the electromagnetic array 702 indexed by the current value of i is enabled and receives the activation current pulse. The activation current pulse may be generated by applying a voltage across the element in the electromagnetic array 702 that is indexed by the current value of i. The electromagnetic mating interface in the bottom modular device 212 may wait for a predefined period of time (T) at block 910. While waiting, or after waiting, the electromagnetic mating interface in the bottom modular device 212 may determine if a connection has been established. Such determination may be made based on the detection of signals transmitted to, and received from the top modular device 202. Additionally or alternatively, the determination may be made based on signals received an electromagnetically activated switch, a mechanically actuated switch, a capacitive switch and/or any other suitable proximity sensor.

If at block 912 it is determined that a connection with the top modular device 202 has been detected, then the activation current may be suppressed, communication with the top modular device 202 may be established and the interrupt signal on the interrupt line 714, 814 may be cleared, masked or otherwise ignored at block 916.

If at block 912 it is determined that a connection with the top modular device 202 has not yet been detected, then at block 918 it may be determined whether a threshold maximum period of time allowed for the automated docking or mating process has been reached or exceeded. If the maximum period of time has been reached or exceeded, then the automated docking or mating process may be terminated at block 920 and the interrupt signal on the interrupt line 714, 814 may be cleared, masked or otherwise ignored at block 916. If the maximum period of time has not been reached then the element selector is incremented by setting i=i+1 mod (K) at block 922 and continuing the process at block 908.

Figure 10:
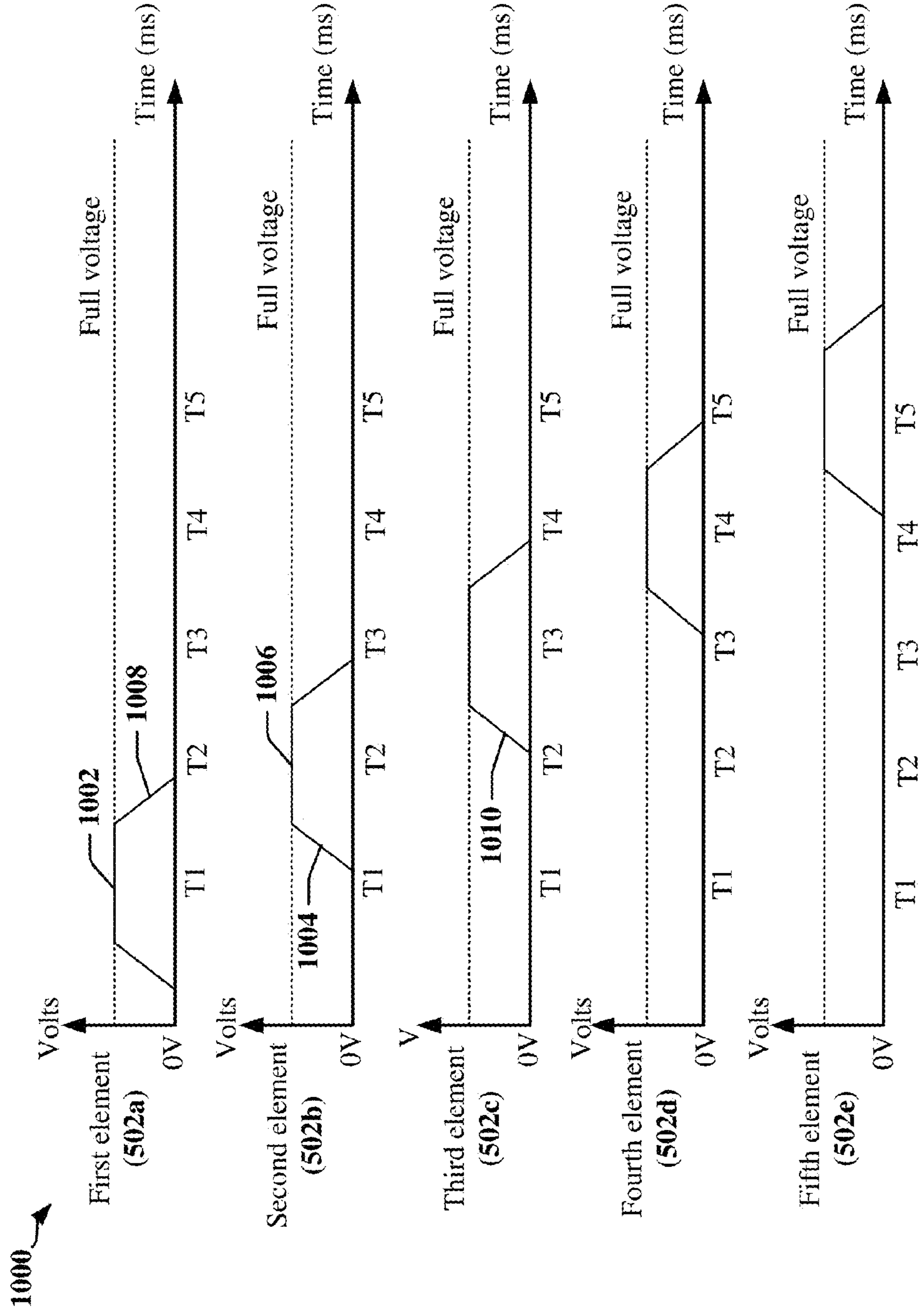
FIG. 10 includes timing diagrams illustrating a first example of the provision of an activation voltage to electromagnetic elements in different time intervals in accordance with certain aspects disclosed herein.

In some instances, a modified mode of driving the electromagnetic array 702 may be adopted. With reference also to FIG. 10, the modified scheme may include providing ramp-ups 1004, 1010 and ramp-downs 1008 on voltage pulses applied to the elements 502*a*-502*e* of the electromagnetic array 702. In one example, a first element 502*a* is driven at full voltage level 1002, and an increasing voltage level 1004 may be applied to a second element 502*b*. As the voltage level 1004 applied to the second element 502*b* reaches the full voltage level 1006, a decreasing voltage level 1008 may be applied to the first element 502*a*. When the voltage level 1008 applied to the first element 502*a* reaches 0 Volts, an increasing voltage level 1010 may be applied to a third element 502c. The gradient and duration of the ramps 1004, 1008, 1010 may be selected to accomplish design objectives, which may include providing sufficient torque to ensure rotation of the top modular device 202, efficiently achieving synchronization and/or "capturing" of the permanent magnet 210 mounted on the annular track 206, and optimize power consumption. Capture of the permanent magnet 210 mounted on the annular track 206 may occur when a rotating magnetic field engages with the permanent magnet 210 and drives the permanent magnet 210 ahead of the rotating magnetic field and/or pulls the permanent magnet 210 behind the rotating magnetic field.

In some instances, voltages may be ramped in a non-linear manner. In one example, the ramps 1004, 1008, 1010 may be formed by providing one or more voltage steps between 0 Volt and the full voltage level. In another example, different-sized steps in voltage may be provided between 0 Volt and the full voltage level. The ramps 1004, 1008, 1010 may be implemented in blocks 908 and/or during the wait period of block 910.

Figure 11:
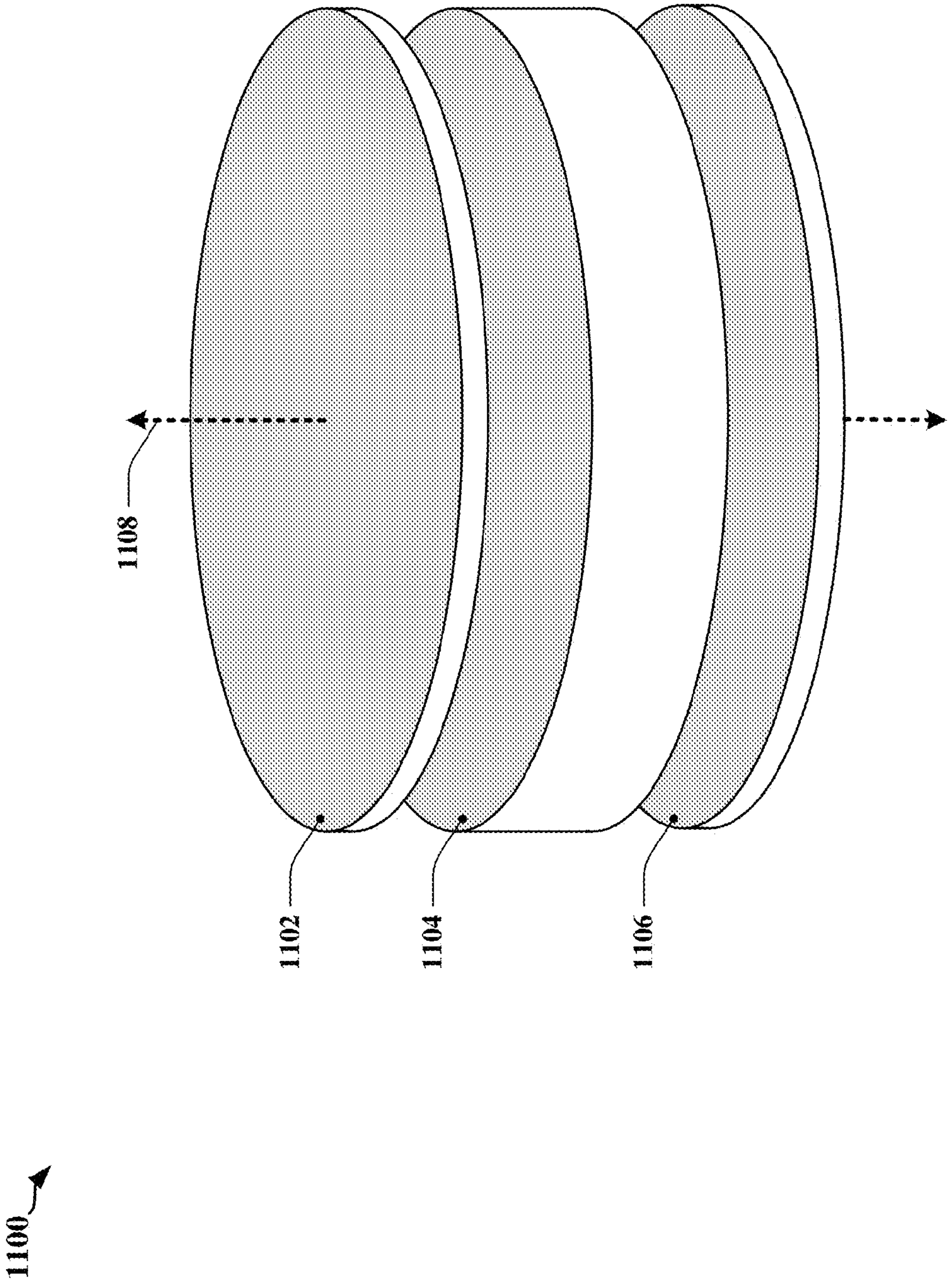
FIG. 11 illustrates a configuration in which a modular device may be mated with end pieces.

FIG. 11 illustrates a configuration 1100 in which a modular device 1104 may be mated with end pieces 1102 and 1106. The end pieces 1102, 1105 may include a lid, cap or base provided for decorative reasons and/or to cover and protect unused connections. In some instances, a base 1106 may include a power supply, power distribution connectors and other devices and features that may be used or connected to multiple modular devices 1104 and/or different types of modular devices 1104. A powered base 1106 may be capable of automated docking an unpowered modular device 1104.

According to certain aspects disclosed herein, the top modular device 202 can be docked and connected to the bottom modular device 212 while the top modular device 202 is unpowered. Power dissipation associated with the automated docking or mating process may be limited to periods of time when modules 202, 212 are being actively connected. Threaded elements provided on the raised annular element 206 and the annular channel 216 may be configured to retain the coupling between the top modular device 202 and the bottom modular device 212 without powering any electromagnetic components. The threaded elements may additionally provide a sturdy connection between the two devices 202, 212, and the connection can be resistant to disconnections due to shaking and/or falling events.

The configuration of the surface areas 204*a*/204*b*, 214*a*/214*b* of the top modular device 202 and the bottom modular device 212 respectively provides a relatively large surface area that can be contact between the two devices. This surface area may support a significant number of connectors 228, 230 and can provide both serial and parallel communication links.

In some instances, the two devices 202, 212 may be disengaged by employing a "reverse" electromagnetic drive procedure. In one example, the sequence in which activation voltages are applied to each of the electromagnetic elements 502*a*-502*e* in different time intervals (see FIG. 6) may be reversed. That is, a sequence that causes top modular device 202 to rotate counter clockwise with respect to a bottom modular device 212 during an automatic mating procedure may be reversed to cause the top modular device 202 to rotate clockwise with respect to the bottom modular device 212. Disengagement may be initiated in response to a command or electrical input received by the microcontroller 710 (see FIG. 7) or multiplexing control circuit 810 710 (see FIG. 8).

Figure 12:
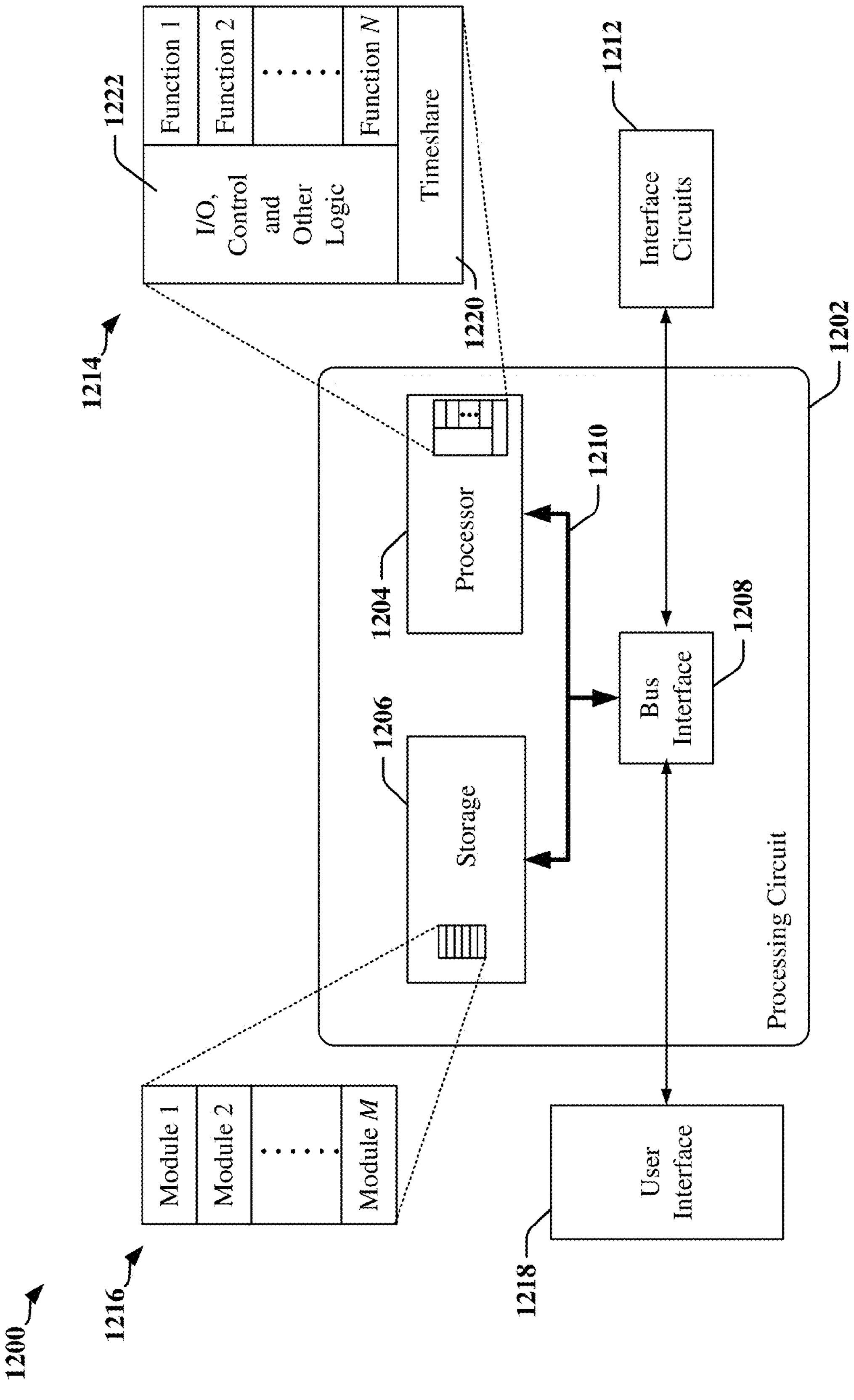
FIG. 12 is a block diagram illustrating an example of an apparatus employing a processing circuit that may be adapted according to certain aspects disclosed herein.

FIG. 12 is a conceptual diagram 1200 illustrating a simplified example of a hardware implementation for an apparatus employing a processing circuit 1202 that may be configured to perform one or more functions disclosed herein. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more interface circuits 1212. The interface circuits 1212 may include line drivers that provide voltages and/or currents to connectors located on a surface of a modular component. The interface circuits 1212 may include optical line drivers. The interface circuits 1212 may further include a transceiver for each networking technology supported by the processing circuit. In some instances, multiple networking technologies may share some or all of the circuitry or processing modules found in a transceiver 1212. Each interface circuit 1212 provides a means for communicating with various other apparatus over a transmission medium. Depending upon the nature of the apparatus, a user interface 1218 (e.g., keypad, display, speaker, microphone, joystick) may also be provided, and may be communicatively coupled with the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the transceiver 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the transceiver 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
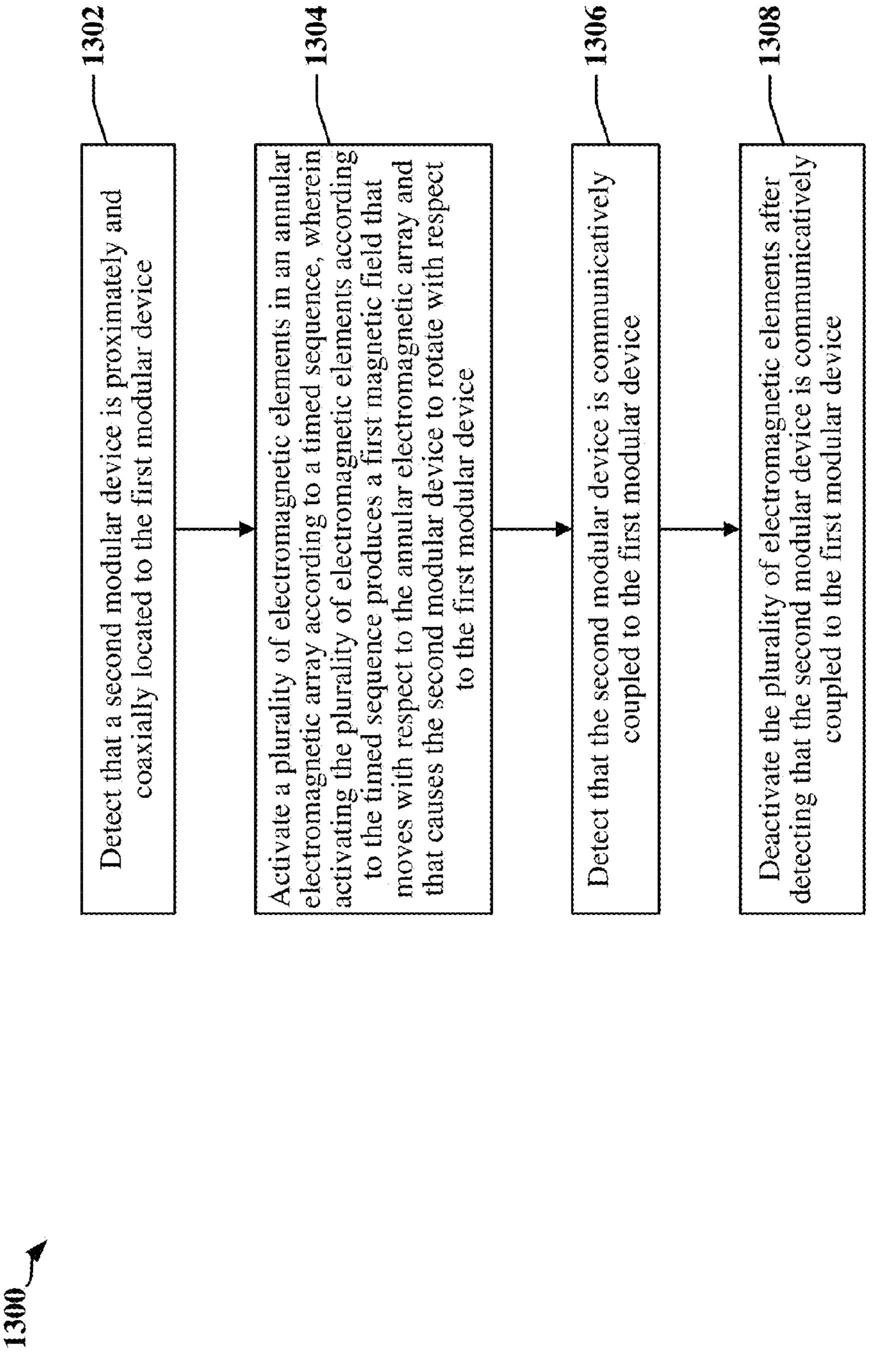
FIG. 13 is a flow chart of an interconnection method that may be performed by a first modular device of an electronic system.

FIG. 13 is a flow chart 1300 of an interconnection method that may be performed by a first modular device of an electronic system. At block 1302, the device may detect that a second modular device is located in proximity to and coaxially aligned with the first modular device.

At block 1304, the device may activate a plurality of electromagnetic elements in an annular electromagnetic array according to a timed sequence. Activating the plurality of electromagnetic elements according to the timed sequence may produce a first magnetic field that moves with respect to the annular electromagnetic array and that causes the second modular device to rotate with respect to the first modular device. Activating the plurality of electromagnetic elements according to the timed sequence may include activating each electromagnetic element at a different time than the other electromagnetic elements in the plurality of electromagnetic elements. Activating the plurality of electromagnetic elements according to the timed sequence may produce a first magnetic field that rotates around the annular electromagnetic array. During the timed sequence, the first magnetic field may engage a permanent magnet disposed on a raised annular element of the first modular device that is aligned with an annular channel provided in a first surface of the first modular device. An interaction between the first magnetic field and a second magnetic field produced by a magnetic element disposed on the second modular device generates a torque on the second modular device.

At block 1306, the device may detect that the second modular device is communicatively coupled with the first modular device. Detecting that the second modular device is communicatively coupled with the first modular device may be accomplished by receiving a signal from a proximity sensor provided on the first surface of the first modular device.

At block 1308, the device may deactivate the plurality of electromagnetic elements after detecting that the second modular device is communicatively coupled with the first modular device. Detecting that the second modular device is located in proximity to and coaxially aligned with the first modular device may include detecting a signal transmitted between the first modular device and the second modular device through a connector located on a first surface of the first modular device.

In some examples, the annular electromagnetic array is provided in the annular channel provided in the first surface of the first modular device. The raised annular element of the first modular device may include an embossed rubberized track. The raised annular element may include a threaded element configured to engage a corresponding threaded element of the annular channel when the second modular device is rotated. Continued rotation of the second modular device may operate to fasten the second modular device to the first modular device.

In one example, activating the plurality of electromagnetic elements according to a timed sequence includes defining a plurality of time periods in the time sequence. During a first time period, a voltage pulse may be provided to a first electromagnetic element while current flow in a second electromagnetic element and/or in a third electromagnetic element is disabled. During a second time period, a voltage pulse may be provided to the second electromagnetic element and current flow in the first electromagnetic element and/or in the third electromagnetic element may be disabled. During a third time period, a voltage pulse may be provided to the third electromagnetic element while current flow is disabled in the first electromagnetic element and the second electromagnetic element.

In another example, activating the plurality of electromagnetic elements according to a timed sequence includes defining a plurality of time periods in the time sequence. During a first time period a decreasing voltage is applied to a first electromagnetic element, a predefined maximum voltage is applied to a second electromagnetic element, an increasing voltage is applied to a third electromagnetic element, and current flow is disabled in a fourth electromagnetic element. During a second time period, a decreasing voltage is applied to the second electromagnetic element, the predefined maximum voltage is applied to the third electromagnetic element, an increasing voltage is applied to the fourth electromagnetic element, and current flow is disabled in the first electromagnetic element.

Figure 14:
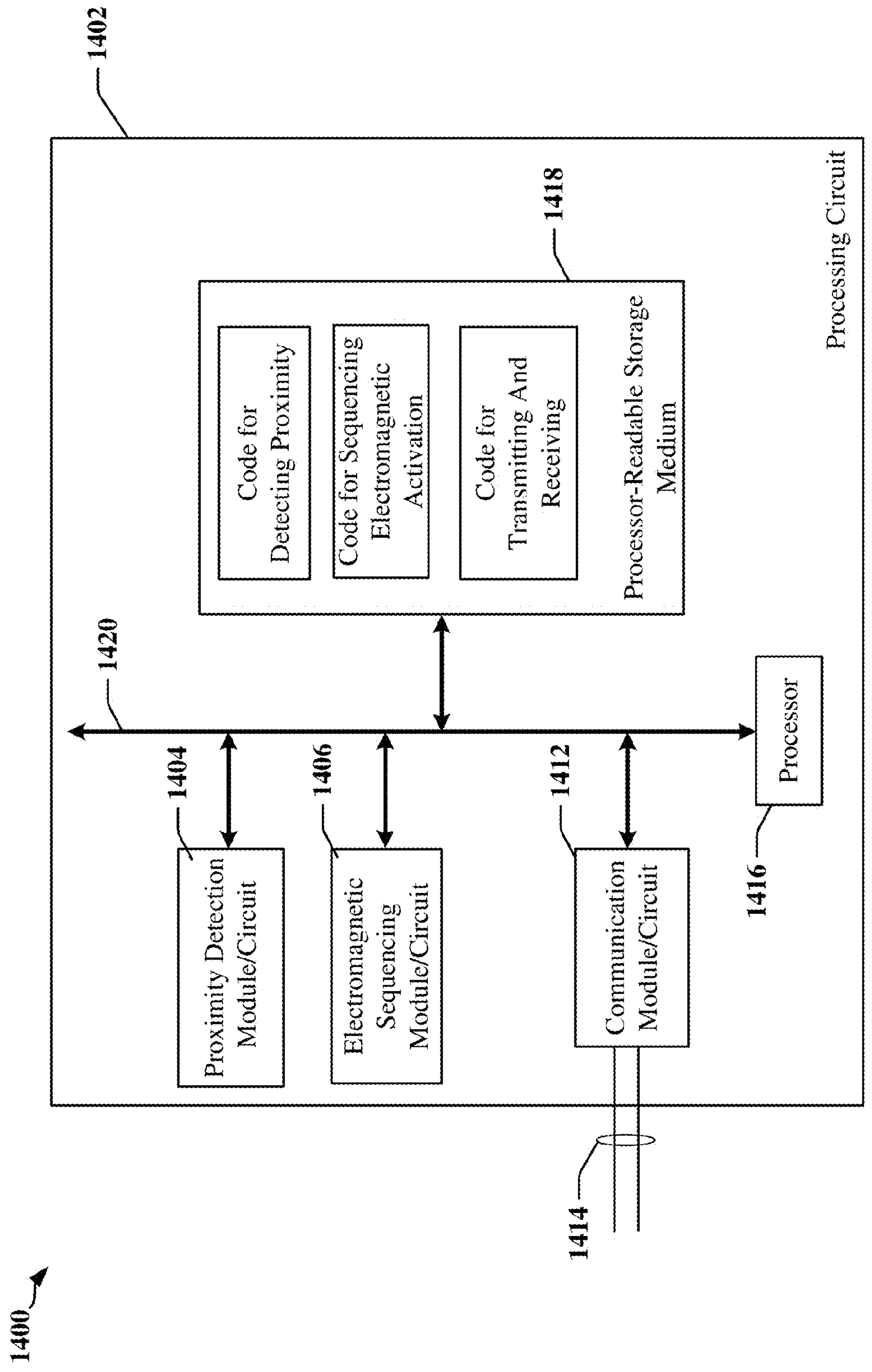
FIG. 14 is a diagram illustrating an example of a hardware implementation for an apparatus employing a processing employing a processing circuit adapted according to certain aspects disclosed herein.

FIG. 14 is a diagram 1400 illustrating a simplified example of a hardware implementation for an apparatus employing a processing circuit 1402. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406 and communication or line interface circuits 1412 configurable to communicate over connectors or wires 1414 and the computer-readable storage medium 1418. The bus 1420 may also link various other circuits such as timing sources, peripherals, voltage regulators, and power management circuits, which are well known in the art, and therefore, will not be described any further.

The processor 1416 is responsible for general processing, including the execution of software stored on the computer-readable storage medium 1418. The software, when executed by the processor 1416, causes the processing circuit 1402 to perform the various functions described supra for any particular apparatus. The computer-readabke storage medium 1418 may also be used for storing data that is manipulated by the processor 1416 when executing software, including data decoded from symbols transmitted over the connectors 1414, which may be configured as data lanes and clock lanes. The processing circuit 1402 further includes at least one of the modules 1404, 1406 and 1408. The modules 1404, 1406 and 1408 may be software modules running in the processor 1416, resident/stored in the computer readable storage medium 1418, one or more hardware modules coupled to the processor 1416, or some combination thereof The modules 1404, 1406 and/or 1408 may include microcontroller instructions, state machine configuration parameters, or some combination thereof In one configuration, the apparatus 1400 for wireless communication includes a module and/or circuit 1404 that is configured to detect proximity of a second apparatus to the first apparatus and/or alignment and mating of the first apparatus and the second apparatus, a module and/or circuit 1406 that controls sequencing of activation currents provided to electromagnetic elements in an electromagnetic array, and a module and/or circuit that manages communication between the first apparatus and the second apparatus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a first modular device in an electronic system, comprising:

detecting that a second modular device is located in proximity to and coaxially aligned with the first modular device;

activating a plurality of electromagnetic elements in an annular electromagnetic array according to a timed sequence, wherein activating the plurality of electromagnetic elements according to the timed sequence produces a first magnetic field that moves with respect to the annular electromagnetic array and that causes the second modular device to rotate with respect to the first modular device;

detecting that the second modular device is communicatively coupled with the first modular device; and deactivating the plurality of electromagnetic elements after detecting that the second modular device is communicatively coupled with the first modular device.

2. The method of claim 1, wherein activating the plurality of electromagnetic elements according to the timed sequence comprises:

activating each electromagnetic element at a different time than the other electromagnetic elements in the plurality of electromagnetic elements.

3. The method of claim 1, wherein activating the plurality of electromagnetic elements according to the timed sequence produces a first magnetic field that rotates around the annular electromagnetic array.

4. The method of claim 1, wherein an interaction between the first magnetic field and a second magnetic field produced by a magnetic element disposed on the second modular device generates a torque on the second modular device.

5. The method of claim 1, wherein during the timed sequence the first magnetic field engages a permanent magnet disposed on a raised annular element of the first modular device that is aligned with an annular channel provided in a first surface of the first modular device.

6. The method of claim 5, wherein the annular electromagnetic array is provided in the annular channel provided in the first surface of the first modular device.

7. The method of claim 5, wherein the raised annular element of the first modular device comprises an embossed rubberized track.

8. The method of claim 5, wherein the raised annular element comprises a threaded element configured to engage a corresponding threaded element of the annular channel when the second modular device is rotated, and wherein continued rotation of the second modular device fastens the second modular device to the first modular device.

9. The method of claim 5, wherein detecting that the second modular device is communicatively coupled with the first modular device comprises:

receiving a signal from a proximity sensor provided on the first surface of the first modular device.

10. The method of claim 1, wherein detecting that the second modular device is communicatively coupled with the first modular device comprises:

detecting a signal transmitted between the first modular device and the second modular device through a connector located on a first surface of the first modular device.

11. The method of claim 1, wherein activating the plurality of electromagnetic elements according to a timed sequence comprises:

during a first time period, providing a voltage pulse to a first electromagnetic element and disabling current flow in a second electromagnetic element and a third electromagnetic element;

during a second time period, providing a voltage pulse to the second electromagnetic element and disabling current flow in the first electromagnetic element and the third electromagnetic element; and during a third time period, providing a voltage pulse to the third electromagnetic element and disabling current flow in the first electromagnetic element and the second electromagnetic element.

12. The method of claim 1, wherein activating the plurality of electromagnetic elements according to a timed sequence comprises:

during a first time period, applying a decreasing voltage to a first electromagnetic element, applying a predefined maximum voltage to a second electromagnetic element, applying an increasing voltage to a third electromagnetic element, and disabling current flow in a fourth electromagnetic element;

during a second time period, applying a decreasing voltage to the second electromagnetic element, applying the predefined maximum voltage to the third electromagnetic element, applying an increasing voltage to the fourth electromagnetic element, and disabling current flow in the first electromagnetic element.

13. A modular electronic device, comprising:

a first proximity detector provided on a first surface of the modular electronic device, wherein the first proximity detector is configured to detect a magnetic field emanating from a second device when the second device is positioned in proximity to the modular electronic device such that an axis of the modular electronic device is aligned with an axis of the second device;

an electromagnetic array comprising a first plurality of electromagnetic elements provided in an annular channel; and a controller configured to provide an activation current to each of the first plurality of electromagnetic elements in a sequence that produces a magnetic field that rotates around the annular channel and that causes the second device to rotate with respect to the modular electronic device, wherein the controller is configured to disable the activation currents when the second device is determined to be mated to the modular electronic device in an alignment that provides communicative coupling between the modular electronic device and the second device.

14. The modular electronic device of claim 13, wherein the second device is configured to rotate in response to a torque developed by an interaction between the magnetic field that rotates around the annular channel and a second magnetic field produced by a magnetic element disposed on the second device.

15. The modular electronic device of claim 14, wherein the magnetic element comprises a permanent magnet disposed on a raised annular element of the second device that has a threaded element configured to engage with a threaded element provided within the annular channel.

16. The modular electronic device of claim 15, wherein the raised annular element of the modular electronic device comprises an embossed rubberized track.

17. The modular electronic device of claim 14, further comprising:

a second proximity sensor disposed at a predefined radial distance from the axis of the modular electronic device, wherein the second proximity sensor is adapted to generate a signal after detecting presence of a permanent magnet on the second device.

18. The modular electronic device of claim 14, wherein the controller is configured to disable the activation currents when a signal is received through a connector located on a first surface of the modular electronic device.

19. The modular electronic device of claim 13, wherein the activation currents are provided as non-overlapping pulses to the first plurality of electromagnetic elements.

20. The modular electronic device of claim 13, wherein each electromagnetic element is configured to receive an activation current that is generated by applying an increasing voltage to the each electromagnetic element for a first period of time, applying a maximum voltage to the each electromagnetic element for a second period of time, and by applying a decreasing voltage to the each electromagnetic element for a third period of time.

21. The modular electronic device of claim 13, wherein the controller is configured to provide activation currents to a second plurality of electromagnetic elements in the electromagnetic array in parallel to the activation currents provided to the first plurality of electromagnetic elements.

22. A modular electronic device comprising:

an electromagnetic array comprising a first plurality of electromagnetic elements provided in an annular channel;

means for detecting that a second device is located in proximity to and coaxially aligned with the modular electronic device;

means for activating each of the first plurality of electromagnetic elements at a different time than the other electromagnetic elements in the plurality of electromagnetic elements, wherein activating the plurality of electromagnetic elements according to a timed sequence produces a first magnetic field that rotates around the annular channel and that causes the second device to rotate with respect to the modular electronic device; and means for detecting that the second device is communicatively coupled with the modular electronic device, wherein the means for activating each of the first plurality of electromagnetic elements is configured to deactivate the first plurality of electromagnetic elements after detecting that the second device is communicatively coupled with the modular electronic device.

23. The modular electronic device of claim 22, wherein the means for activating the plurality of electromagnetic elements according to the timed sequence is configured to:

activate each electromagnetic element at a different time than the other electromagnetic elements in the plurality of electromagnetic elements, wherein the plurality of electromagnetic elements produces a first magnetic field that rotates around the electromagnetic array in response to the timed sequence.

24. The modular electronic device of claim 22, wherein an interaction between the first magnetic field and a second magnetic field produced by a magnetic element disposed on the second device generates a torque on the second device.

25. The modular electronic device of claim 22, wherein during the timed sequence the first magnetic field engages a permanent magnet disposed on a raised annular element of the modular electronic device that is aligned with an annular channel provided in a first surface of the modular electronic device.

26. The modular electronic device of claim 25, wherein the electromagnetic array is provided in the annular channel provided in the first surface of the modular electronic device, and wherein the raised annular element of the modular electronic device comprises an embossed rubberized track.

27. The modular electronic device of claim 25, wherein the raised annular element comprises a threaded element configured to engage a corresponding threaded element of the annular channel when the second device is rotated, and wherein continued rotation of the second device fastens the second device to the modular electronic device.

28. The modular electronic device of claim 22, wherein the means for detecting that the second device is communicatively coupled with the modular electronic device comprises:

a connector that is communicatively coupled with a corresponding connector of the second device when the modular electronic device and the second device are mated.

29. The modular electronic device of claim 22, wherein the means for activating the plurality of electromagnetic elements according to a timed sequence is configured to:

provide a voltage pulse to a first electromagnetic element while disable current flow in a second electromagnetic element and a third electromagnetic element during a first time period;

provide a voltage pulse to the second electromagnetic element and disable current flow in the first electromagnetic element and the third electromagnetic element during a second time period; and provide a voltage pulse to the third electromagnetic element and disable current flow in the first electromagnetic element and the second electromagnetic element during a third time period.

30. A non-transitory computer-readable medium comprising code for:

detecting that a second modular device is located in proximity to and coaxially aligned with a first modular device;

activating a plurality of electromagnetic elements in an annular electromagnetic array according to a timed sequence, each electromagnetic element being activated at a different time than the other electromagnetic elements in the plurality of electromagnetic elements, wherein activating the plurality of electromagnetic elements according to the timed sequence produces a first magnetic field that rotates around the annular electromagnetic array and that causes the second modular device to rotate with respect to the first modular device;

detecting that the second modular device is communicatively coupled with the first modular device; and deactivating the plurality of electromagnetic elements after detecting that the second modular device is communicatively coupled with the first modular device.

* * * * *